United States Patent Office.

DEXTER B. ANDREWS, OF FORT WAYNE, INDIANA.

Letters Patent No. 61,378, dated January 22, 1867.

COMPOSITION FOR KINDLING FIRES.

*The Schedule referred to in these Letters Patent and making part of the same.*

TO ALL WHOM IT MAY CONCERN:

Be it known that I, DEXTER B. ANDREWS, of Fort Wayne, in the county of Allen, and State of Indiana, have invented a new and useful improvement in Composition for Kindling Fires; and I do hereby declare that the following is a full, clear, and exact description of the mode of compounding and preparing the same.

Take the following ingredients, and unite them in the following proportions: rosin, two pounds; tallow, four ounces; pine or other saw dust, four quarts. Melt the rosin and tallow together at as low a temperature as will melt them thoroughly. Then add the saw dust, and work thoroughly until all the ingredients are commingled perfectly. Then place in moulds, and subject to heavy pressure; after which the cakes are ready for use. The material should be prepared in conveniently-sized cakes. The moulds should have such bars across their faces as will form the cakes with square lines depressed in their surface, so that they may be easily broken into pieces, such as may be required for use. The moulds should be oiled to prevent adhesion. And I interpose, also, an oiled cloth between the composition and the follower.

I do not make any claim upon the mode of manufacturing; but what I claim as my invention, and desire to secure by Letters Patent, is—

A composition for kindling fires, compounded from the materials, and substantially as set forth.

In testimony whereof I have signed my name to this specification in the presence of two subscribing witnesses.

DEXTER B. ANDREWS.

Witnesses:
    SOL. D. BAYLESS,
    FERD. F. BOLTZ.